United States Patent Office 3,748,155
Patented July 24, 1973

3,748,155
METHOD OF MAKING INVESTMENT MOLDS
FROM IMPROVED PATTERN MATERIAL
Fred B. Speyer, Euclid, Ohio, assignor to TRW Inc.,
Cleveland, Ohio
No Drawing. Continuation-in-part of abandoned application Ser. No. 98,099, Dec. 14, 1970. This application
May 15, 1972, Ser. No. 253,188
Int. Cl. B28b 7/34
U.S. Cl. 106—38.2
5 Claims

ABSTRACT OF THE DISCLOSURE

Method of making investment molds wherein an improved pattern material is employed, the pattern material containing a waxy solid and up to 50% by weight of ethyl cellulose, the pattern material having a relatively low softening point and very low viscosity in the fluid state at a temperature at which it is injected into the pattern die.

CROSS REFERENCE TO RELATED APPLICATION

This application is a continuation-in-part of my copending Ser. No. 98,099, filed Dec. 14, 1970, now abandoned.

BACKGROUND OF THE INVENTION

Field of the invention

This invention is in the field of manufacture of investment casting molds through the use of an improved pattern material containing a waxy material combined with ethyl cellulose in controlled amounts.

DESCRIPTION OF THE PRIOR ART

The investment casting process, or "lost wax" process as it is sometimes called involves forming a disposable pattern, typically of wax, by injection molding the same in a pattern die. It is of significant importance to differentiate between compositions which are to be used as wax patterns and conventional thermoplastic molding compositions suitable for injection molding. Wax melt patterns for investment casting are most often produced using a gravity feed, low pressure, hydraulic ram plunger such as in a Leyden wax injection press. This requires hot melts having water-like fluidity at temperatures below 180° F. There have been some hot melt compositions disclosed in the prior art which employ ethyl cellulose but which have much higher softening and melting temperatures and much higher viscosities so that they can be processed by calendering or by screw-type injection molding.

It is most important in the production of patterns to achieve minimal cavitation, dish, shrink and other properties, and this necessitates having a very low melt flow temperature accompanied by extremely low viscosities. After injection and solidification, the pattern is used in a mold-making process which involves the alternate steps of dipping the pattern into a slurry of finely divided ceramic materials and suitable binders, and stuccoing. Through repeated applications of these steps, with intermediate drying, a relatively porous, smooth surface mold is built up measuring from about ¼ to ½ inch in thickness. After firing, a smooth surface refractory mold suitable for the casting of high melting metals or alloys is produced.

The selection of a suitable pattern material is of substantial importance in the overall process of investment mold making. Among the many properties which must be considered in any pattern material are (1) its ash content,
(2) the production of a suitable surface finish,
(3) resistance to the primary coat, binder and carriers used in the investment slurries,
(4) resistance to gum formation in the injection machine,
(5) low viscosity, at low melt temperatures,
(6) suitable strength, both tensile and impact,
(7) a suitable ductile-to-brittle transition temperature range,
(8) a suitable solidification temperature range,
(9) oxidation resistance,
(10) wettability
(11) its weld strength or adhesiveness so that patterns may be joined together and the pattern may be joined to a suitable sprue,
(12) suitable coefficients of thermal expansion, shrinkage, dish, cavitation and sink,
(13) suitable hardness,
(14) suitable softening temperature, and
(15) lack of toxicity.

In addition to the foregoing physical characteristics, for purposes of economy, the pattern material should be reclaimable by ordinary recovering procedures, and must be composed of relatively inexpensive, commercially available materials.

Many of the pattern compositions of the present invention meet all of these requirements and provide an improved wax based composition having very low shrinkage and suitable hardness and toughness characteristics.

SUMMARY OF THE INVENTION

The thermoplastic compositions used as patterns in the present invention are designed to meet the rigid requirements of low temperature, low viscosity hot melt injection molded compositions. The most suitable compositions contain from 40 to 60% by weight of a hydrocarbon or substituted hydrocarbon resin, from 30 to 50% of a mixture of saturated fatty acids having a titer of from 113 to 149° F., from 5 to 20% of a wax having a softening point of at least 140° F., and from 2 to 15% of ethyl cellulose, all percentages being by weight. The composition may optionally contain from 0.5 to 2.0% by weight of an antioxidant.

The preferred compositions of the present invention mentioned in the preceding paragraph meet the following rigid specifications. They have an injection melt flow at a temperature of less than 180° F., and a viscosity at 180° F., less than 2,000 centipoises, and usually less than 1,000 centipoises. Their ash content is less than 0.01%. The sagging properties of the solidified material measured on a ⅛ by 8 inches by 1 inch bar are less than 0.035 inch for 48 hours at 77° F. The lineal shrinkage measured on a specimen ⅛ inch by 5 inches by 1 inch is less than 0.005 inch. The deflection of a bar measuring ⅛ inch by 5 inches by 1 inch at a load of 400 grams is less than 0.06 per ten seconds at 77° F. At a load of 147.5 grams at a temperature of 90° F., the deflection is less than 0.07 per ten seconds. The stress rupture on a specimen of ¼ inch by 5 inches by 1 inch measured as deflection to fracture is less than 0.5 inch per 3 inch span per .005 inch per second at 77° F.

In addition, the patterns produced with the preferred compositions are free from flow lines, cavitation and crack propagation flaws. The compositions are both hard and non-brittle and have a softening point less than 180° F. They possess minimum cold flow and creep properties. They evidence minimal property changes on long term heating, and are stress relieved from crystalline growth. They have a rapid set time, are non-adhesive to the pattern die, and possess weldability. They are also wettable by water base slurries and can be reclaimed by ordinary recovery procedures.

DESCRIPTION OF THE PREFERRED EMBODIMENTS

I have found that plastic pattern materials having a wide range of properties can be produced by incorporating ethyl cellulose in an amount of up to 50% by weight with a waxy solid. Ethyl cellulose is manufactured by the reaction of chemical cellulose with caustic to form alkali cellulose which is then reacted with ethyl chloride to form ethyl cellulose. The degree of toughening contributed to a pattern melt, as well as the change in softening point is in proportion to the viscosity of the ethyl cellulose used, i.e., its ethoxyl content. A high viscosity ethyl cellulose provides more toughness and higher melting points. Using more than 50% by weight of ethyl cellulose raises the viscosity of the melt so that compounding of the pattern material becomes impractical. Ethyl cellulose is compatible alone with waxy oxygen and nitrogen containing resins. However, this material is incompatible, by itself with non-oxygen or nitrogen containing resins, or with paraffin or high melting microcrystalline waxes derived from petroleum. Such blends can be made compatible, however, through the use of coupling agents which are compatible with both the ethyl cellulose and the other waxy solids. Typical examples of coupling agents are fatty acids having from 12 to 18 carbon atoms per molecule, certain natural waxes such as spermaceti, montan, and candelillia waxes, synthetic waxes such as hydrogenated castor oil, rosin esters and phenolic resins.

Ethyl cellulose acts as a toughening agent which enhances the cast pattern flexibility and its mechanical shock resistance. This material further decreases both the amount of sag and the load deflection of the formed melt pattern. It also reduces the set time of the injected melt. Ethyl cellulose also serves to reduce tackiness which would otherwise cause sticking of the pattern to the metal dies. For best results, the ethyl cellulose used in accordance with the present invention should have an ethoxyl content between 47.5 and 49.0% of the theoretical maximum ethoxylation. The viscosity of the ethyl cellulose should be in the range from 3 to 52 centipoises at a 5% concentration in weight in an 80/20 toluene-ethanol solution at 25° C.

Excellent shrinkage characteristics of the compositions of the present invention are provided by the presence of one or more saturated fatty acids having a titer in the range from 113 to 149° F. A particularly preferred combination contains from 40 to 50% stearic acid and from 50 to 60% of palmitic acid. This binary mixture may contain up to about 6% of other fatty acids such as myristic, margaric, pentadecanoic, etc. The combination of 55 parts of palmitic acid to 45 parts of stearic acid provides a combination of physical properties which is not obtained from other fatty acid compositions. This compositional ratio gives a titer from about 127° F. and a minimum percentage of shrinkage for any of the two acids. Furthermore, at this compositional range the specific gravity is about 0.93, whereas other blends of the two acids have specific gravities as high as .99. The Shore hardness of the 55/45 mixture is about 45, whereas stearic acid alone has a Shore hardness of about 20 and palmitic acid has a Shore hardness of about 25.

While the combination of stearic and palmitic acids provides the preferred embodiment of the present invention other saturated acids containing from 12 to 18 carbon atoms can also be used alone or in combination, such as lauric, myristic, margaric, or pentadecanoic acids.

There are a number of hydrocarbon resins which can be employed for the purposes of the present invention, primarily to achieve the proper cohesive characteristics. The resin components should in no way degrade the composition in its moisture resistance, volatility, heat stability, odor or toxicity. The resin system should not unduly alter the melt viscosity nor the softening range and should contribute to hardness. Suitable resins include rosin derivatives, terpene resins, coal tar resins, petroleum hydrocarbon resins, and styrene copolymers as well as substituted hydrocarbon resins such as alkyd resins, and polyindene resins. One particularly preferred resin is that known commercially as "Wingtack" and is a product of Goodyear Chemicals. This resin is a polymerization product of unsaturated hydrocarbons having substantially the following analysis:

| | Percent by weight |
|---|---|
| 2-pentene | 4.8 |
| 2-methyl-2-butene | 42.2 |
| Isoprene | 2.5 |
| 1,3-pentadiene | 42.4 |
| 2,3-dimethyl-1-butene | 2.3 |
| Unsaturated $C_5$–$C_6$ hydrocarbons | 5.5 |

While the compositions of the present invention may contain no hydrocarbon resin, the presence of these resins is definitely advisable to achieve proper cohesion. The broad range for the hydrocarbon resin content is 0 to 60% with the provision that the sum of the hydrocarbon resin content and the fatty acid content is from 30 to 90% of the composition.

While many different types of waxes are suitable as long as they have a softening point of from 140 to 210° F., I particularly prefer to use a microcrystalline wax having a softening point of at least 180° F. Paraffinic and natural waxes can also be used. The addition of the wax imparts flowability to the melt, viscosity control and thus contributes to the surface qualities of the injected pattern.

Pattern materials for investment casting may be maintained in the molten state for long periods of time, so that some degree of degradation by atmospheric oxygen can be expected. Consequently, it is desirable to provide an antioxidant which is compatible with the melt and at the same time provides protection to the combination of ethyl cellulose, synthetic hydrocarbon resin, fatty acids and wax. A particularly useful antioxidant is 2,6-di-tert-butyl-para-cresol whose activity is due to its symmetrical, but highly hindered phenolic structure which readily forms a free radical and thereby interrupts the chain reaction of the oxidative degradation of the melt. Other antioxidants and heat stabilizers which can be used in the melt composition are 4-tert-butylcatechol, "Paraplex 660" or "G62" which are polyester plasticizers, "Monoplex S–71" which is a monomeric ester-type plasticizer, "ERL–2774" (an epoxy resin), "Ferro 900," methylene-bis-methyl-tert-butyl phenol, stearamide, phenothiazone, substituted quinolines, and octyl phenol. Particularly good results have been obtained with a combination of di-tert-butyl-para-cresol and "ERL–2774." The latter is an epoxy acid acceptor which reacts with acid degradation products produced at high temperatures and thus prevents further degradation.

A typical formula for producing an improved pattern material is given in the following table:

| | Parts by weight |
|---|---|
| Hydrocarbon-resin "Wingtack 95" | 47 |
| Fatty acids (53% palmitic, 42% stearic, 2.5% myristic, 2.0% margaric, .5% pentadecanoic) | 37 |
| Microcrystalline wax (180–195° F., softening point) | 10 |
| Ethyl cellulose (47.5–49.5% ethoxyl) | 5 |
| Antioxidant (2,6-di-tert-butyl-para-cresol) | 1 |

The physical properties of the pattern material given in the foregoing table are set forth below:

Viscosity at 160° F., c.p.s. — <1000
Ball and ring softening point, ° F. — 145–165
Hardness, needle penetrometer mm./400 g./ 5 sec. at 77° F. — 0.5–0.8
Injection temperature, ° F. — 150–160
Deflection (5″ x 1″ x ⅛″):
 In/400 g./10 sec. at 77° F. — 0.05–0.07
 In/147.5 g./10 sec. at 90° F. — 0.055–0.075

Examples of suitable compositions containing no hydrocarbon resins are given below:

| Percent | I | II |
|---|---|---|
| 45 stearic acid-55 palmitic acid mixture | 68 | 60 |
| Microcrystalline wax (180° F. softening point) | 18 | 18 |
| Ethyl cellulose | 13 | 13 |
| Butylated hydroxy toluene | 1 | 1 |
| Paraffin wax |  | 8 |

To illustrate the wide variety of melt compositions which are benefited by the inclusion of ethyl cellulose, the following table is offered:

| Percent | III | IV | V | VI |
|---|---|---|---|---|
| Ethyl cellulose (7 cps. viscosity) | 13 | 6 | 20 | 50 |
| Stearic acid | 60 | 10 | 55 | 50 |
| Hydrogenated castor oil |  |  | 43 |  |
| Paraffin wax | 8 | 10 |  |  |
| Microcrystalline wax | 18 |  | 5 |  |
| Hydrocarbon resin "Wingtack 95" |  | 30 | 20 |  |
| Antioxidant (2,6-di-tert-butyl-para-cresol) | 1 | 1 |  |  |
| Ball and ring softening point, ° F. | 159 | 178 | 135 | 142 |

Patterns formed according to the present invention can be used in the manufacture of shell-type investmtnt molds by the usual procedures well known in this art. Such procedures are summarized, for example, in vol. 5 of the "Metals Handbook," Eighth edition at pages 245–246. Such disclosure is incorporated in this application by reference.

Basically, shell molds are built up by dipping the pattern assemblies into slurries of ceramic powder suspended in a liquid, draining the excess, stuccoing the wetted surface with dry refractory particles, either by sprinkling or by immersion in a fluidized bed and then drying the resultant coating. The process is repeated until the required mold thickness is built up. The initial coating for a precoat usually employs a slurry that is made of finely ground particles to provide a smooth surface. The smoothness of the precoat largely determines the smoothness of the cast surface. Subsequent coatings usually contain increasingly coarser refractory grains.

The number of coatings applied depends on the required thickness of the shell. The thickness of ceramic shells usually ranges from ¼ to ½ inch depending mainly on casting shape and weight, cluster size and type of ceramic and binder.

Ceramic shells are dried or cured after each dipping operation to allow bonding of the individual layers. In drying, moisture removal is regulated by control of wet and dry bulb temperatures, air flow and time. Final drying and bonding of the shell usually occur during the dewaxing operation and during firing of the mold before casting. Drying time depends on the shape of the patterns, and on air temperature, humidity and circulation.

Many different types of refractory particles have been used in building up shell-type investment molds. Fused silica is widely used because of its low thermal expansion. Zircon is used extensively because it provides the best surface quality, low cost, high temperature stability, good refractory properties and good resistance to metal attack.

The refractory materials used in the precoat range from about 200 to 1000 mesh in particle size. Materials finer than this have higher surface energy, which results in sintering at appreciably lower temperatures. Coarser materials, ranging up to 325 mesh are used in backup slurries. The coarser materials produce the high porosity required of backup coats.

Binders included in the refractory slurries include materials such as ethyl silicate, sodium silicate and colloidal silica. The coating composition may also include a film former such as an alginate to control viscosity of the slurry, a wetting agent such as an alkyl aryl sodium sulfonate to control the flow characteristics and the pattern wettability, an antifoam agent such as an aqueous silicone emulsion to remove entrapped air, and an antidehydrating agent such as gelatin to control drying and reduce dry-shrink cracks.

A typical formulation for a fused silica precoat slurry may contain 29% by weight of colloidal silica in the form of a 20 to 30% concentrate, 71% by weight of fused silica and 0.017 to 0.034% of a wetting agent. The ingredients are adjusted to provide a slurry having a specific gravity of about 1.75 to 1.80, and a viscosity of 40 to 60 seconds using a No. 5 Zahn cup at 75 to 85° F.

The refractory for stuccoing the precoat should have a particle size on the order of 60 to 200 mesh depending on the viscosity of the slurry. The refractory must be compatible with the refractory in the precoat slurry and must have similar thermal expansion characteristics.

Fused silica slurries for backup coats are usually prepared with ceramic materials that are 200 to 325 mesh. A typical backup formulation may include about 38% colloidal silica in the form of an 18 to 26% concentrate, along with 62% by weight of fused silica of 200 mesh or finer. Generally a wetting agent is also included in the backup slurry. A typical backup slurry has a No. 4 Zahn cup viscosity of 13 to 19 seconds at 75 to 85° F. For stuccoing the backup coat, refractory particles on the order of 20 to 60 mesh are generally used.

Zircon slurries are very similar to fused silica slurries. A typical zircon slurry may contain 2.5 gallons of 30% colloidal silica, 1 gallon of water, 100 pounds of zircon powder, and 10 cc. of a wetting agent. Such a slurry has a viscosity of 8 to 10 seconds on a No. 4 Zahn cup.

The wax-type patterns can be removed from a mold after it has been built up by a variety of means, such as by a hot vapor of a solvent such as trichlorethylene, flash dewaxing in a furnace, or by treatment in a steam autoclave. The final step of the process consists in firing the ceramic shell mold at a temperature appropriate to the materials used, and which temperature will normally be on the order of 1800 to 2100° F.

It should be evident that various modifications can be made to the described embodiments without departing from the scope of the present invention.

I claim as my invention:

1. In the method of making an investment mold which involves shaping a pattern, coating the pattern with successive layers of refractory particles, removing the pattern after a thin ceramic shell has been built up and firing the resulting shell to produce a mold, the improvement which comprises employing as said pattern a composition having a softening temperature not in excess of 180° F. and a viscosity not in excess of 2,000 centipoises at 180° F., said composition containing from 5 to 20% by weight of a wax having a softening point of at least 140° F., from 40 to 60% by weight of a hydrocarbon or a substituted hydrocarbon resin, from 30 to 50% by weight of saturated fatty acids having a titer of from 113 to 149° F., and from 2 to 15% by weight of ethyl cellulose.

2. The method of claim 1 in which said resin is a rosin derivative, a terpene resin, a coal tar resin, a petroleum hydrocarbon resin, a styrene copolymer, an alkyd resin, or a polyindene resin.

3. The method of claim 1 in which said composition contains both palmitic acid and stearic acid.

4. The method of claim 1 in which said ethyl cellulose has an ethoxyl content of 47.5 to 49%.

5. The method of claim 1 in which said wax includes microcrystalline wax.

References Cited

UNITED STATES PATENTS

| | | | |
|---|---|---|---|
| 2,872,326 | 2/1959 | Morris | 106—191 |
| 3,296,006 | 1/1967 | Horton | 106—38.7 |
| 3,655,414 | 4/1972 | Hoffman et al. | 106—38.8 |
| 3,667,979 | 6/1972 | Merges et al. | 106—38.7 |

LORENZO B. HAYES, Primary Examiner

U.S. Cl. X. R.

106—38.25, 38.35, 38.5 R, 38.8